Nov. 7, 1961     H. DÖLZ     3,007,625
RECIPROCATING PISTON COMPRESSOR
Filed March 22, 1960
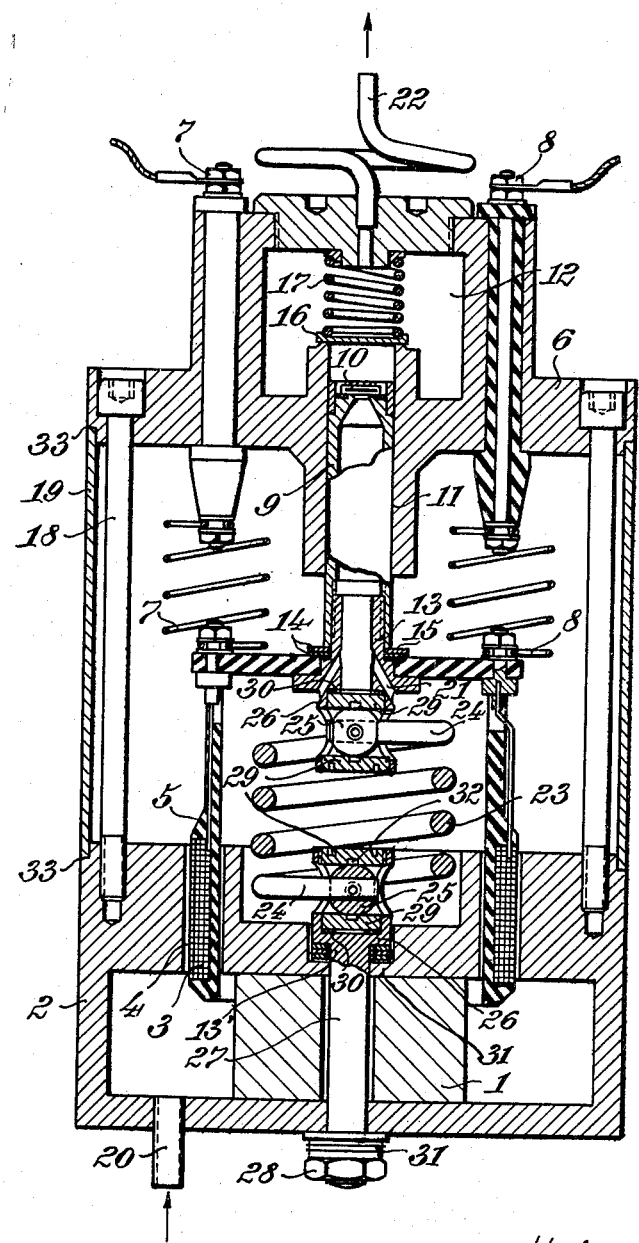
INVENTOR
Heinrich Dölz

United States Patent Office 3,007,625
Patented Nov. 7, 1961

3,007,625
RECIPROCATING PISTON COMPRESSOR
Heinrich Dölz, Nymphenburgerstrasse 9, Berlin-Schoneberg, Germany
Filed Mar. 22, 1960, Ser. No. 16,681
Claims priority, application Germany May 14, 1959
13 Claims. (Cl. 230—55)

The present invention relates to improvements in reciprocating piston compressors which are driven by electric oscillators.

In reciprocating piston compressors, and especially those of the type in which the armature of an electric oscillator acts directly upon the piston, it is necessary in order to attain a high electro-mechanical efficiency of the oscillator to compensate for the weight of the moving masses inluding the piston and for the pressure of the gas above it by the provision of suitable resilient means. This is usually attained by connecting the reciprocating masses consisting primarily of the armature of the electric oscillator and the compressor piston which is secured thereto, to the body of the compressor housing by means of mechanical springs which are designed to take into account the resilient action of the gas during the compression and release thereof, the friction occuring during the reciprocation, and the effective work to be produced so as to form a mechanical oscillating system, the mechanical natural frequency of which is equal to or at least substantially equal to the frequency of the oscillations of the electric oscillator.

These mechanical springs, hereinafter called oscillating springs, are therefore to be regarded as an essential component of the electrical oscillator since the proper function of the latter depends very greatly upon them. The principal elements which form the body of the compressor housing are the stator of the electric oscillator, the cylinder block of the compressor, and the outer walls or the jacket of the housing. Since the mass of the housing is much greater than that of the oscillating parts, the housing may be regarded as being practically stationary.

Such oscillating compressors have the advantage of possessing only a single movable element. The bearing or bearings thereof are, however, extremely sensitive to the influence of transverse forces, i.e. forces which act unilaterally and transverse to the direction of reciprocation of the compressor piston. Any transverse forces which might occur gradually wipe away the necessary oil film between the cylinder and piston and possibly also in the additional bearings. This oil film cannot be reformed as in the case of rotary movements of a shaft in a bearing. Since these transverse forces engage at points outside of the bearings, they cause considerable wedging and binding effects, as well as losses in power due to friction, and also considerable noise.

It is already known from the prior art to provide a compressor of the above-mentioned type with an oscillating armature which is suspended relative to the compressor housing by means of one or two cylindrical coil springs which, after being wound, are biased, and the axis of which is intended to coincide with the direction of movement of the oscillating armature. If only one spring is applied, the ends thereof must be firmly secured. If these compressors are to work properly, it is necessary that the springs be very accurately wound and mounted so that their axis will not deviate in the least from the axis of the compressor piston, and they must also remain exactly co-axial to the piston during the operation. It is, however, practically impossible to comply with both of these conditions at the same time, and it is therefore unavoidable in spring suspensions of the mentioned kind that mechanical transverse forces act upon the piston and the bearings.

It is an object of the present invention to provide a compressor with a reciprocating piston which is operated by an electric oscillator and provided with at least one coil spring, the axis of which coincides with the axis of the oscillating system.

A further object of the invention is to provide a compressor of the above-mentioned type in which any action of transverse mechanical forces upon the piston and bearings will be avoided by suspending the oscillating spring or springs in such a manner that the points of engagement of the spring or springs with the compressor housing and the oscillating elements will always remain coaxial with the axis of the oscillating system, even during the operation of the compressor, so that no transverse forces or leverages will occur or act upon the oscillating system.

These objects are attained according to the invention by designing the oscillating spring so that its points of engagement or mounting points will coincide with the axis of the oscillating system also during the operation of the compressor and that the spring is rotatable about any axis perpendicular or vertical to the axis of oscillation and preferably about the latter axis as well. If a single oscillating spring is applied, the ends of this spring in the released condition of the latter should be designed so as to be exactly opposite to each other and to extend toward the axis of the spring. The bearing elements for mounting the spring preferably consist of a pair of balls each of which is secured to one end of the spring and is rotatably mounted between suitable bearing points which are disposed within the axis of oscillation. In place of such balls, it is also possible to mount at least one of the spring ends by a gimbal suspension.

If a single spring according to the invention is used which is subjected to tension and compression, it is possible to dimension this spring so that the force necessary to effect a lateral buckling of the spring will always lie far above the maximum force by which the spring will be compressed during the operation of the compressor.

Due to the universally rotatable mounting of the spring ends, it is possible to use springs which are not wound in a geometrically precise shape. The spring suspension according to the invention has the further advantages that the spring is easily installed and that, because of the omission of a rigid mounting of its ends, these ends are subjected to considerably smaller mechanical stresses and are therefore protected from breaking.

It is a further object of the present invention to combine the new spring suspension with an electric oscillator which is designed so as to be devoid of any electromotoric transverse forces. This includes especially an electric oscillator with an armature of nonmagnetic material, that is, a so-called electrodynamic oscillator, the armature of which forms a moving coil which oscillates within an air gap of a magnetic field formed by a permanent magnet. The new combination of a mechanical armature suspension which is not affected by any transverse forces with an electric oscillator which is likewise free from any transverse forces affords for the first time the possibility of constructing oscillating compressors for small refrigerating apparatus in which no other forces occur than those which are effective in the direction of the longitudinal axis of the oscillator and thus also in the direction of the axis of the compressor piston. This has the advantage of avoiding the usual bearing and lubricating difficulties of such small compressor refrigerators, which is of the greatest importance in such fully enclosed apparatus which must be capable of operating at uniformly high efficiency for a long period of time.

These and other objects, features, and advantages of the present invention will become more apparent from the following detailed description of a preferred embodiment thereof which is to be read with reference to the accompanying drawing which shows a longitudinal section of an electro-dynamic oscillator excited by a permanent magnet and having an armature in the form of an oscillating coil which is freely movable within an annular gap in the magnetic circuit and connected to the compressor piston of a small electric refrigerating apparatus.

Referring to the drawing, a permanent magnet is mounted in a cup-shaped member 2 of magnetic material which also forms the pole ring and is separated from the core by an annular gap 4 in which a coil 3 is adapted to oscillate freely without engaging with the walls of the gap. Coil 3 is wound on a cylindrical supporting member 5 of nonmagnetic material and supplied with alternating current through the leads 7 and 8. The frequency of the oscillation of this electro-dynamic oscillating system is equal to the frequency of the alternating current which is supplied thereto.

The upper part 6 of the housing contains a compressor cylinder 11 with a collecting chamber 12 therein which, in turn, contains an outlet valve 16 which is acted upon by a spring 17. A hollow compressor piston 9 which is slidable within cylinder 11 and also contains an intake valve 10 is connected to the coil supporting member 5 by means of a sleeve or socket 13 which is screwed into the lower end of piston 9 and carries on its lower end a bearing cage 26. A cup spring 14 and a washer 15 are interposed between the end surface of piston 9 and the upper surface of the top of the coil supporting member 5 to secure these parts rigidly to each other.

The housing part 6 of the compressor is connected to the soft-iron cup 2 by a spacing sleeve 19 which is fitted into grooves 33 and accurately centers the housing part 6 relative to the soft-iron cup 2 so that the bore of cylinder 11 is exactly coaxial with the gap 4. Bolts 18 rigidly secure housing part 6 to cup 2.

The gaseous refrigerant to be conveyed enters the inner chamber of the compressor from below through the intake pipe 20, passes through the annular gap 4 and thereby also cools the coil 5, and then flows through bores 21 in bearing cage 26 and the central bore in sleeve 13 into the hollow piston 9. During the downward movement of piston 9, the gas passes through the opened intake valve 10 and is then compressed during the upward movement of the piston. When the outlet valve 16 is opened, the gas is forced into chamber 12 and leaves the compressor under pressure through outlet pipe 22.

The oscillating spring of the compressor consists of a cylindrical coil spring 23, the ends 24 of which are bent so as to extend toward the central axis of the spring in a direction which is as precisely radial as possible. The ends of spring 23 carry balls 25 which may be rigidly secured thereto by being cemented, soldered, shrunk, or spot-welded thereon. The center of each of these balls 25 should substantially coincide with the central axis of the spring.

Balls 25 serve as a leverage-free mounting of the spring ends 24 within the center line of the direction of movement which coincides with the central axis of the compressor piston. For this purpose, balls 25 are mounted in special bearing cages 26, the upper one of which is mounted on sleeve 13, while the lower cage 26 as well as the pole piece and the permanent magnet 1 are secured by a bolt 27 to the soft-iron cup 2 of the electric oscillator by means of a washer and a nut 28. Each bearing cage 26 contains a pair of bearing disks 29, each of which is provided with a central recess 32 in the side facing the ball 25 for retaining the ball in a central position within the common axis of piston 9 and the oscillator. The outer bearing disk 29 in each cage is screwed into the same, while the inner bearing disk 29 is axially slidable within the respective cage, and is acted upon by a plate spring 30 of such a tension that ball 25 on each end of spring 23 is easily rotatable within recesses 32 of bearing disks 29 but is held without play even at the longest possible strokes of the compressor piston.

Due to such a suspension of spring 23 it is possible to prevent any mechanical transverse forces from being transmitted from the spring to the driven parts, even though the spring might not be very accurately coiled or the spring arms 24 might not be bent so as to precisely intersect the central axis of the spring, or the centers of the balls do not accurately coincide with the axis of the spring. The suspension of spring 23 by means of balls 25 therefore permits certain tolerances in the accuracy of constructing and mounting the spring. Thus, even if the axis of the oscillating spring is slightly oblique to the central axis of the compressor piston, no transverse forces can occur. The spring in its released condition need not be of a very accurate length to insure that the oscillating coil 3 will be in the proper position within the air gap 4 of the magnet, if provisions are made for axially adjusting the bearing cages, and preferably the lower bearing cage 26. Such an adjustment may be carried out, for example, by means of the bolt connection 27, 28 which may be set so that the oscillating coil and the compressor piston are disposed in the exact central position. It is therefore no longer necessary to make the oscillating spring of such accurate dimensions as was previously required, which constitutes a further considerable advantage of the invention. This adjustment of the lower bearing cage may be carried out in the embodiment illustrated by the insertion of different numbers of spacing washers 31.

The leverage-free suspension of the oscillating parts 5 and 9 may also be attained by using other types of springs, for example, conical or cup springs, as well as by other spring mountings, for example, by a knife-edge mounting of the spring ends. The particular manner of mounting the oscillating spring illustrated in the drawing is, however, preferred for the following two advantages. First, the oscillating mass of a cylindrical coil spring extends substantially coaxially and uniformly about the central axis thereof so that the transverse dynamic forces are so small that they may be practically neglected. This also applies to noncylindrical coil springs, for example, conical coil springs. Furthermore, at the point of entry of the spring arms into the balls, no tangential or bending stresses are generated in the spring material, so that a breakage of the spring at these points, common with rigidly clamped spring ends, will hardly ever occur.

When using cylindrical coil springs, it is advisable to provide a number of effective coil turns equal to $n+\frac{1}{2}$, in which $n$ is an integer. The rotary movements of the balls in their bearings during the oscillation of the spring will then be very small and practically nonexistent, while with coil springs having an integral number of coil turns these rotary movements will be considerable.

The embodiment of the invention illustrated in the drawing forms a combination of an electric oscillator, which is devoid of transverse forces since the armature thereof only contains nonmagnetic material, with an oscillating spring which is designed and suspended so as to be likewise free of transverse forces. The entire oscillating compressor is therefore free of all mechanical or electromotoric transverse forces whatsoever, that is, no forces occur other than those acting in the direction of movement of the oscillating piston.

It will thus be evident that the oscillating compressor according to the invention which is entirely free of transverse or shearing forces, does not require any oil-lubrication of its bearings even when operating for a long time, especially if the surfaces which slide on each other are self-lubricating, for example, nitrided.

The combination of an electro-dynamic oscillator with an oscillating spring suspension, both of which are free from transverse forces, thus permits the production of compressors which do not require any lubrication or servicing and remain in proper operating condition for a long time.

Although my invention has been illustrated and described with reference to a preferred embodiment thereof, I wish to have it understood that it is in no way limited to the details of such embodiment, but is capable of numerous modifications within the scope of the appended claims.

Having thus fully disclosed my invention, what I claim is:

1. In a compressor unit having a cylinder, a reciprocating piston within said cylinder, an electric oscillator for driving said piston, and at least one coil spring for compensating the weight of the piston and the movable parts of the oscillator and the pressure of gas compressed by said piston, in which said spring has an axis substantially coinciding with the common axis of said piston and oscillator, bearing means for mounting said spring and connecting the same to said piston and to a substantially stationary element, respectively, and means associated with said bearing means for preventing any transverse forces produced by said spring from acting upon said bearing means and comprising a member for connecting each end of said spring with one of said bearing means, each of said members engaging at any time with said bearing means at a point within said central axis and being rotatable on said bearing means about said axis and any axis extending vertical to said axis.

2. In a compressor unit as defined in claim 1, in which said oscillator comprises an electrodynamic oscillator having an armature devoid of any magnetic materials for preventing the generation of any electromotoric transverse forces so that, by the combination of said oscillator with the rotatable mounting of said spring ends within said central axis, all electromotoric and mechanical transverse forces will be avoided.

3. In a compressor unit as defined in claim 1, the two ends of said spring extending opposite to each other relative to the axis of said spring and rotatably mounted about two axes extending vertically to said central axis.

4. In a compressor as defined in claim 1, in which said connecting members comprise a pair of balls secured to the opposite ends of said spring, the points of engagement of said balls with said bearing means being disposed within said central axis and the axes of rotation of said balls extending through the centers thereof even though the axis of each of said spring ends might intersect said central axis at different angles.

5. In a compressor as defined in claim 1, in which said spring is of a cylindrical shape and has a plurality of coil windings, the number of the effective windings being an integral number plus a half coil winding.

6. In a compressor as defined in claim 4, further comprising means for maintaining each of said balls in positive engagement with said bearing means.

7. In a compressor as defined in claim 6, in which said bearing means comprise a pair of bearing cages, said ball on each of said spring ends being disposed within one of said cages, and a pair of bearing members at opposite sides of each ball and coaxial with said central axis, at least one of said bearing members being slidable in the axial direction, said means for maintaining said balls in positive engagement with said bearing means comprising a plate spring for pressing said slidable bearing member into engagement with said ball.

8. In a compressor as defined in claim 7, in which each of said bearing cages comprises a tubular member having at least one lateral opening in its wall for the insertion of said ball on said spring end, each of said bearing members comprising a disk, said disks being mounted within said tubular member.

9. In a compressor as defined in claim 1, means for adjusting at least one of said bearing means in the axial direction.

10. In a compressor as defined in claim 9, in which said adjusting means comprise a bolt on one of said bearing means, means for securing said bolt to the housing of said compressor, and exchangeable spacing washers on said bolt for adjusting the position of said bolt and bearing means in the axial direction relative to said housing.

11. In a compressor as defined in claim 10, in which said oscillator has a magnetic circuit comprising a plurality of members, said bolt being also adapted to secure said last members to each other.

12. In a compressor as defined in claim 7, in which one of said bearing cages is secured to a bolt, means for securing said bolt to the housing of said compressor, a socket rigidly connected to the armature of said oscillator and secured at one end to the other bearing cage and screwed at the other end into said compressor piston, said socket having an axial bore communicating with the hollow inside of said piston, and lateral apertures leading into said axial bore for passing a flow of gas from the gas intake of said compressor along said armature and through a chamber within said armature containing said spring and then into said piston.

13. In a compressor as defined in claim 1, in which said compressor further comprises a cylinder head, said oscillator having a magnetic circuit including an outer soft-iron part and an air gap, a spacing sleeve connecting said cylinder head with said soft-iron part and centering the same relative to each other, and bolts connecting said cylinder head to said soft-iron part so that the axis of said cylinder substantially coincides with the axis of said air gap and the axis of oscillation of said oscillator.

References Cited in the file of this patent
UNITED STATES PATENTS

| | | |
|---|---|---|
| 2,430,758 | Crise | Nov. 11, 1947 |
| 2,627,811 | Van Ryan | Feb. 10, 1953 |
| 2,934,256 | Lenning | Apr. 26, 1960 |